March 23, 1965  R. J. SCHAEDLER ETAL  3,174,597

IMPACT CLUTCH

Filed Dec. 19, 1961  5 Sheets-Sheet 1

March 23, 1965 R. J. SCHAEDLER ETAL 3,174,597

IMPACT CLUTCH

Filed Dec. 19, 1961 5 Sheets-Sheet 4

INVENTORS
RAYMOND J. SCHAEDLER
ROGER C. SIMMONS
BY
Raymond G. Mullee
ATTORNEY

INVENTORS
RAYMOND J. SCHAEDLER
ROGER C. SIMMONS
BY
Raymond G. Muller
ATTORNEY

United States Patent Office 3,174,597
Patented Mar. 23, 1965

3,174,597
IMPACT CLUTCH
Raymond J. Schaedler, Utica, and Roger C. Simmons, New Hartford, N.Y., assignors to Chicago Pneumatic Tool Company, New York, N.Y., a corporation of New Jersey
Filed Dec. 19, 1961, Ser. No. 160,553
22 Claims. (Cl. 192—30.5)

This invention relates to impact clutches for driving threaded fasteners such as nuts, bolts and screws, and for other purposes. It has especial, though not exclusive, application to a power operated impact wrench of the type in which a rotary air motor has a direct drive with a rotatable hammer and starts and stops in unison with the hammer as the latter delivers a series of rotational impacts to an anvil or output shaft.

An object of the invention is to enable an impact wrench of a given size and weight to deliver rotational impulses of maximum force.

Another object is to absorb or minimize the shocks resulting from the torsional impacts and thereby prolong the life of the clutch parts that are subject to wear and breakage.

A further object is to prevent the transmission of vibrations to the wrench housing.

In accordance with the above objects, the illustrative embodiment of this invention comprises a rotatable hammer, arranged in surrounding relation to the driven shaft or anvil, and constructed to produce a maximum fly wheel effect in a minimum space. The hammer carries with it in its rotation a pair of dog pins which reciprocate as they move into and out of the path of the anvil jaws, but the hammer is axially immovable. By means of a novel cam arrangement the dogs are projected axially into impacting position upon predetermined relative movement between the hammer and anvil, and deliver one blow for each 360° of relative rotation. The force of the rotational impact is distributed over multiple dogs striking multiple jaws simultaneously, thereby minimizing breakage and vibration. This arrangement requires that each dog be held out of the path of the anvil jaws between impacts as the dog passes by the jaw other than the one it is designed to strike. The hold-out means includes a spring which constantly urges the dog pins toward declutching position and which is intermittently overcome by the cam arrangement.

The use of dog pins to strike an anvil, and the arrangement of such pins to reciprocate longitudinally relative to a non-reciprocating hammer, are broadly old in the art and have been accepted commercially because the cylindrical pin is inexpensive to manufacture and can be replaced easily when the dogs become worn without replacing the rest of the hammer assembly. In the usual dog pin assembly, the axis of each pin lies parallel to the axis of revolution of the clutch, the rear part of the dog pin is supported in a bore in the hammer, and the front part of the pin projects beyond the front extremity of the hammer and intermittently into and out of the path of the anvil jaws which also lie forwardly of the front extremity of the hammer. As a result of this construction, the dog pins are subjected to shearing forces at the instant of impact and prematurely wear out or become broken under fatigue failure.

A specific object of this invention, therefore, is to obviate breakage of dog pins by avoiding the construction which places them in shear and substituting a novel arrangement which places the impact portions of the pins under radial compression at the time of impact. In accordance with this object, the cylindrical hammer or fly wheel is extended forwardly beyond the front extremity of the dog pins and beyond the front of the anvil jaws. At the instant of impact, therefore, the reactive force of the anvil is transmitted diametrically through the center of the pin and to the opposite side of the pin to a driving wall in the hammer which is located in the same cross sectional plane as the anvil jaw rather than some other plane which is offset axially, as in conventional pin type impact clutches.

Still another object is to adapt the impact clutch for operation in either direction of rotation. In accordance with this object, the cam mechanism, which projects the dogs toward the anvil as they approach the respective jaws, comprises a driven cam element carried by the anvil in fixed angular relation to the jaws, and a driving cam element which is carried by the hammer assembly in fixed angular relation to the dogs under some conditions but rotatable through a limited arc relative to the dogs under other conditions of operation. The angular looseness or lost motion between the driving cam and hammer assembly enables the driving cam in one direction of rotation to occupy the correct position for engaging the driven cam when the dogs approach within a predeterminde angular distance of the anvil jaws, and also enables the driving cam selectively to occupy a different position which is correctly predetermined to produce the same results in the reverse direction.

A feature of the invention is a steel ball which constitutes the driving cam element and which is arranged to travel in an arcuate raceway, the ends of the raceway providing shoulders for driving the ball in opposite directions, the angular lost motion being limited by the distance that the ball moves from one shoulder to the other. The ball revolves forwardly along with the driving shoulder while the cam elements are engaged and overrides the driven cam elements just prior to impact. After the impact, the dogs are returned by a spring and the ball is contacted by a reversely sloping surface on the driven cam element which moves the ball forward ahead of the driving shoulder. This forward movement enables the ball to get out of the path of the driven cam and permit the latter to move the dogs to declutched position. Thereafter the driving shoulder overtakes the ball to eliminate the lost motion temporarily.

Other objects of the invention are to minimize friction, wear and breakage, and to simplify the construction and reduce the manufacturing cost of the impact clutch.

Other objects and features of this invention will appear more clearly from the following description taken in connection with the accompanying drawings and appended claims.

In the drawings which illustrate one embodiment of this invention.

Figures 1, 2, 3:
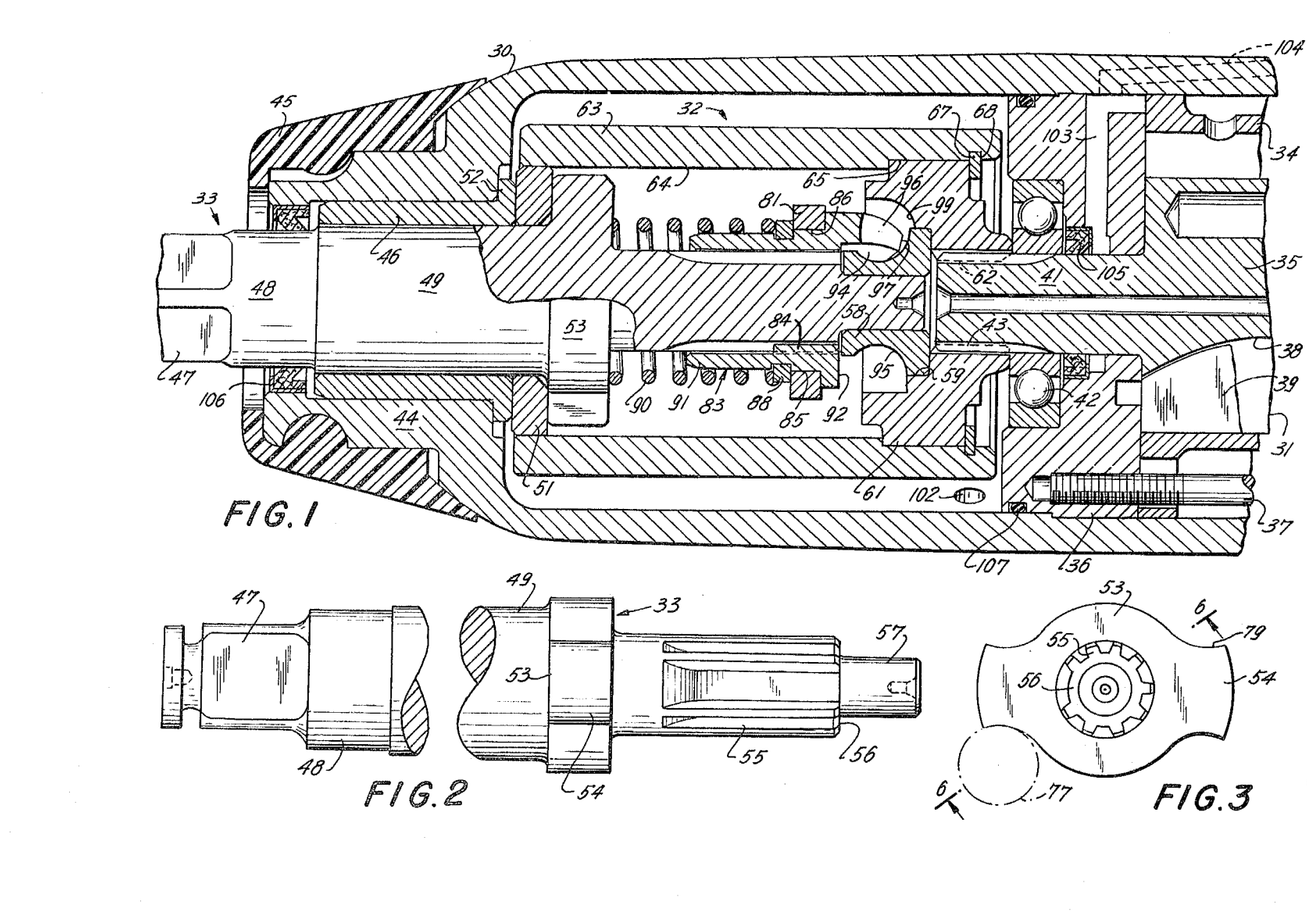
FIG. 1 is a longitudinal section of an impact wrench showing the impact clutch assembly and a portion of the driving motor.
FIG. 2 is a side elevation of the anvil, turned to a different position, with a portion broken away.
FIG. 3 is an elevational view of the rear end of the anvil.

Referring to FIG. 1, the illustrative embodiment of this invention is enclosed within a housing 30 made of any suitable material such as aluminum. Preferably, the housing is an integral casting which includes a handle (not shown) and which encloses the motor 31, the impact clutch assembly 32 and part of the anvil 33. The motor may be of any suitable type, or well known construction, preferably operated by pressure fluid such as compressed air. Briefly described, it comprises an eccentric cylinder 34, a rotor 35 enclosed therein, a front end plate 36 abutting against the front ends of the cylinder and rotor, and a rear end plate (not shown). The parts of the motor are held in assembled relation by any suitable means which may include a longitudinal screw 37 and are fixed against any axial movement relative to the housing 30. The rotor has radial slots 38 in each of which is mounted a vane or blade 39. The vanes slide in and out as the rotor turns and as the outer edges of the vanes maintain contact with the eccentric cylinder 34. For a further description and illustration of a conventional rotary vane type motor, and of the means for supplying live air thereto, and for exhausting the air therefrom, reference is made to Maurer U.S. Patent 2,543,979, March 6, 1951.

Extending longitudinally from the rotor 35 are shafts mounted in the respective end plates to rotate with the rotor about an axis which is substantially concentric with the housing 30. The front rotor shaft 41 is supported in a ball bearing 42, the outer portion of which is secured in the end plate 36. At its front end, the rotor shaft has a splined portion 43 forming a driving shaft for the impact clutch assembly 32.

At its front end, the housing 30 has a nose piece 44, generally of cylindrical shape but of reduced diameter. Sleeved over the nose piece and snugly embracing it is a nose shield 45 composed of resilient material such as rubber. The inside of the nose piece 44 provides a mounting for bushing 46 which is rigidly held therein by a press fit. The bushing is co-axial with the rotor shaft 41 and supports the anvil 33.

The anvil 33, as best shown in FIGS. 2 and 3, is a one piece structure, machined from tough steel. It has a non-circular or square portion 47 near its front end adapted for detachable driving connection with a conventional wrench socket (not shown). Rearwardly of the square portion, the anvil has a cylindrical portion 48 and an enlarged portion or journal 49. The latter has a rotating fit along most of its length with the bushing 46 whereby the bushing supports the anvil in axial alignment with the motor shaft 41. Also surrounding the journal 49 is a spacer ring 51 which seats against a flange 52 on the rear end of the bushing 46. Adjacent the rear end of the journal 49, the anvil has a collar 53. A pair of jaws 54 project outwardly from the collar as best shown in FIG. 3. Collar 53 and the jaws 54 are co-extensive in axial depth whereby the rear faces lie in the same plane, as shown in FIG. 3. The front faces are also co-planar and seat against the spacer ring 51 to prevent the anvil from moving forward relative to the housing 30.

Rearward of the collar 53 and jaws 54, the anvil has a splined portion 55 terminating at a shoulder 56. Rearward of the shoulder, the anvil has a pilot portion 57 which has a rotating fit in a cam pilot 58. The cam pilot abuts against the anvil shoulder 56 and also against a shoulder at the rear end of a counterbore 59 in a driving plate 61. The rear end of the driving plate abuts against the inner raceway of ball bearing 42 and thus cooperates with the cam pilot 57 in preventing the anvil 33 from moving rearward relative to the housing 30. The driving plate and cam pilot portion 57 of the anvil are in axial alignment with the rotor shaft 41. For this purpose, among others, the plate 61 is provided with inner splines 62 (FIGS. 13, 15 and 17) fitting the splined portion 43 of the driving shaft. The cam pilot 58 may be rotatable relative to the plate 61, or to the anvil 33, or relative to both.

Figure 10:
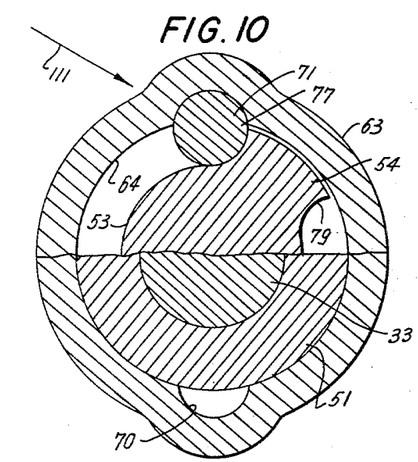
FIG. 10 is a cross section on the irregular line 10—10 of FIG. 6 with the arrow indicating the direction of the impacting force delivered from the hammer to the dog and from the dog to the anvil jaw.

Another function of the driving plate 61 is to cooperate with the spacer ring 51 in supporting a rotatable hammer 63 at its rear and front ends respectively in axial alignment with the driving shaft 41 and anvil 33. The hammer 63 is generally of cylindrical shape, to provide a flywheel effect, and has a long bore 64 extending from the front end and a relatively short counterbore 65 extending from the rear end. The bore has a diameter equal to the outer diameter of the spacer ring 51 (FIG. 10). The spacer ring 51 may rotate relative to the hammer or relative to the anvil 33 or relative to both the hammer and anvil. If desired, the spacer ring 51 could be rigidly attached to the hammer 63 in which case the angular momentum of the spacer ring would supplement that of the hammer 63 and plate 61. In any event, the spacer ring provides a firm support for the hammer on the anvil in front of the jaws 54, and this is an important feature of the present invention. The front end of the counterbore 65 provides a shoulder 66 abutting against the plate 61 to lock the hammer against rearward movement. Forward movement of the hammer 63 relative to the driving plate is prevented by a snap ring 67 abutting against the rear face of the plate 61 and projecting into an annular recess 68 in the counterbore 65. The snap ring is of a well known type sold under the trademark "Truarc" and consists of an integral split ring having a pair of holes 69 (FIG. 16) near its opposite ends to receive a pair of pliers (not shown) to enable the ring to be contracted by force to the diameter of the counterbore, to permit removal from the latter.

Figure 5:
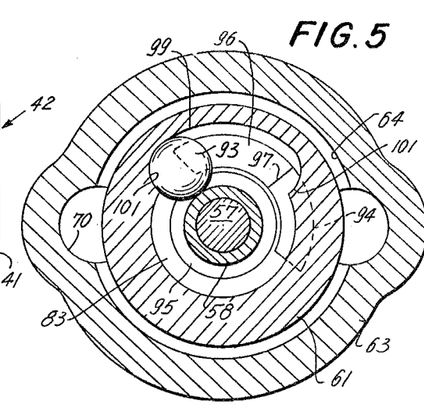
FIG. 5 is a cross section on the line 5—5 of FIG. 4.
Figures 6, 7:
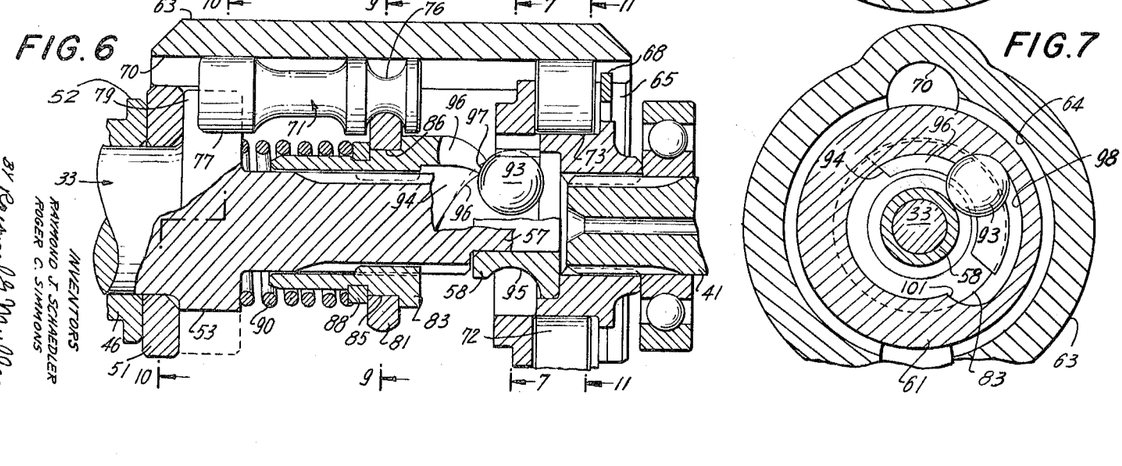
FIG. 6 is a longitudinal section of the impact clutch assembly, with parts broken away, with the dog in its forward position at the instant of impact and with the driving cam ball overrunning the driven cam.
FIG. 7 is a cross section on the line 7—7 of FIG. 6.

The hammer 63 has a pair of arcuate recesses 70 (FIGS. 5–12) intersecting the cylindrical surfaces of bore 64 and counterbore 65 and extending from the front to the rear extremity of the hammer. As seen in FIGS. 6 and 12, the forward part of each arcuate recess provides slidable support and driving connection with a dog pin 71, while the rear part of the recess receives a driving roller 72. There are two dog pins, two driving rollers and two arcuate recesses, and their axes are all in the same plane. Both the dog pins and the rollers 72 have approximately the same radius of curvature as the recesses 70. If desired, there could be a different number of dog pins and driving rollers, or they could be made of different diameters or arranged out of registry with each other, in which case it would be necessary to form the complementary arcuate recesses for the dog pin and roller by separate machining operations. The illustrated arrangement of two dog pins 180° apart and two driving rollers of the same diameter and in registry with the pins is preferred because it minimizes the manufacturing cost and yet provides the required support and balance of torsional thrusts at the opposite ends of the hammer. Each of the driving rollers 72 (FIGS. 22 and 23) fits in an arcuate recess 73 (FIGS. 13, 14, 15, 17) in the periphery of the driving plate 61.

Figure 11:
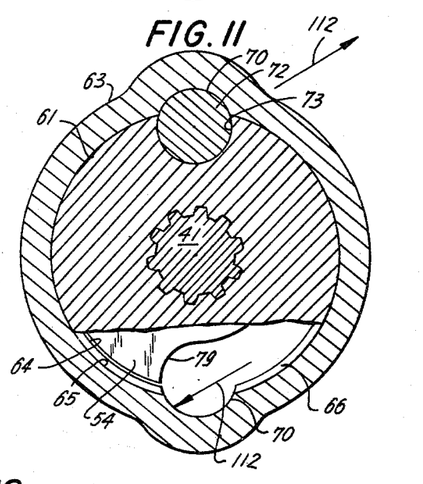
FIG. 11 is a cross section on the line 11—11 of FIG. 6 with the arrows indicating the direction of the thrust from the hammer flange to the driving roller and from the driving roller to the hammer at the instant of impact.
Figure 12:
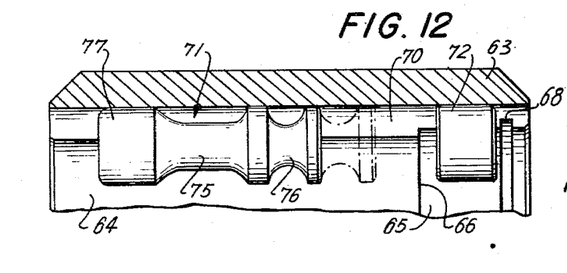
FIG. 12 is a fragmentary longitudinal section of the hammer in the same plane as FIG. 6 showing also the roller and dog in the hammer groove, the broken lines showing the rear end of the dog when it is returned to its disengaged position.

As seen in FIG. 11, the hammer recess 70 extends for almost a half cylinder while the flange recess 73 extends for slightly more than a half cylinder. The two recesses complement each other to engage the driving roller 72 around its entire circumference. The driving rollers therefore are capable of transmitting torque from the driving plate 61 to the hammer 63 in either direction of rotation. Each of the recesses 73 in the plate 61 is closed at the front end and each is partly closed at the rear end by an annular shoulder 74 (FIGS. 14 and 17) thus preventing any appreciable axial movement of the driving roller 72, which might otherwise damage the snap ring 67.

Figure 4:
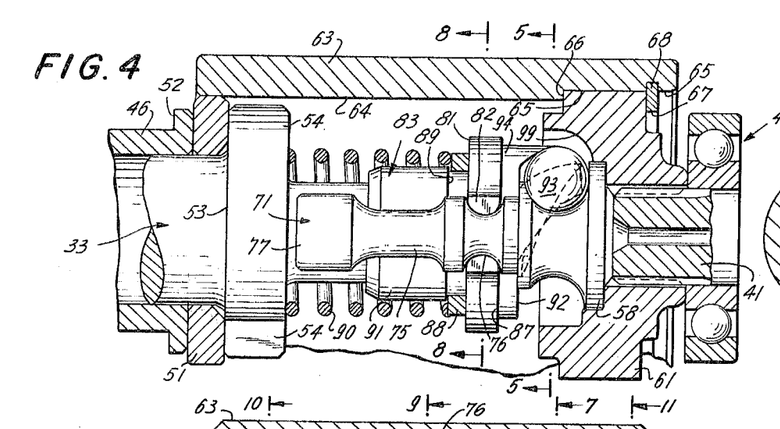
FIG. 4 is a view, partly in longitudinal section and partly in elevation, of the impact clutch assembly with the dog and driven cam in the rearward position and with the driving cam ball starting to engage the driven cam.
Figure 9:
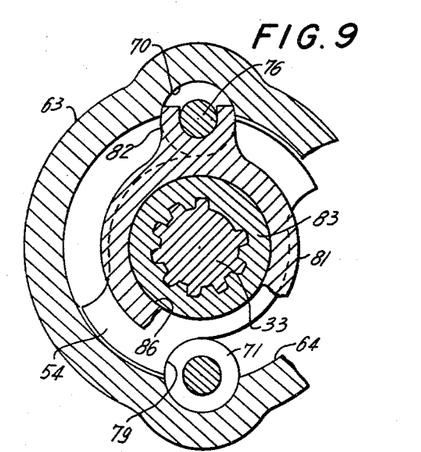
FIG. 9 is a cross section on the line 9—9 of FIG. 6 and corresponds to FIG. 8 except that the yoke and dogs are rotated to striking position.

Each of the dog pins 71, as shown in FIGS. 4, 6 and 12, has portions of cylindrical shape to loosely fit the arcuate recess 70 in the hammer 63. The cylindrical periphery of the dog is interrupted by a long neck 75 and a short neck 76. In front of the long neck, the dog has a striking portion 77 of full diameter movable into and out of the path of the anvil jaws 54. The advanced or striking position of the dog pin is illustrated in FIG. 6 and in full lines in FIG. 12 while the retracted or disengaged position is shown in FIG. 4 and (partly) in broken lines in FIG. 12. The anvil jaws 54 have concave cylindrical surfaces 79 of substantially the same radius, or preferably slightly larger radius, as compared with the striking portion 77, whereby the force of the impact is delivered by the pin along a considerable part of its circumference as seen in FIGS. 9 and 10.

Figure 8:
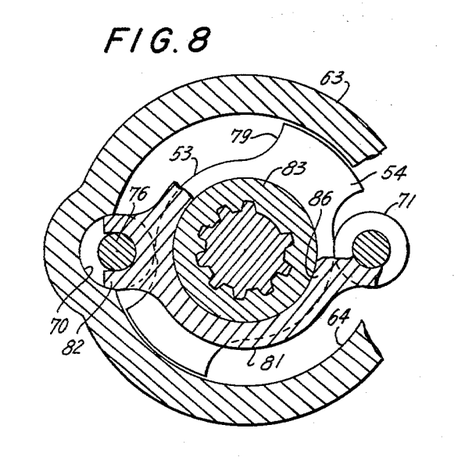
FIG. 8 is a cross section on the line 8—8 of FIG. 4 with part of the dog pin yoke broken off.

The reason for reducing the diameter of the dog pin 71 at the long neck 75 is to minimize the weight and therefore the inertia of the dog and permit it to be reciprocated more rapidly. The function of the short neck 76 is to cooperate with a yoke 81 which imparts such reciprocating movement to the dog. The yoke has a pair of fingers 82 (FIGS. 8 and 9) embracing the inner half of the neck 76, the free ends of the fingers having a loose sliding fit in the arcuate recesses 70. The yoke surface between each pair of fingers is concave in cross section (FIG. 8) and convex in longitudinal section (FIG. 6) to fit the neck 76 in both sectional planes and over a substantial surface area. As a result of this interfitting connection, axial movement of the yoke in either direction is transmitted through the fingers 82 and necks 76 to compel the dogs 71 to reciprocate in unison with the yoke, but neither the yoke nor the dogs revolve relative to the hammer 63, being carried along with the hammer as the latter rotates in unison with the motor shaft 41. Each dog, however, is free to turn about its individual axis, due to the swivel connection between the dog 71 and yoke 81 as shown in FIG. 8.

Figures 13, 14, 15, 16, 17, 18, 19, 20, 21, 22, 23:
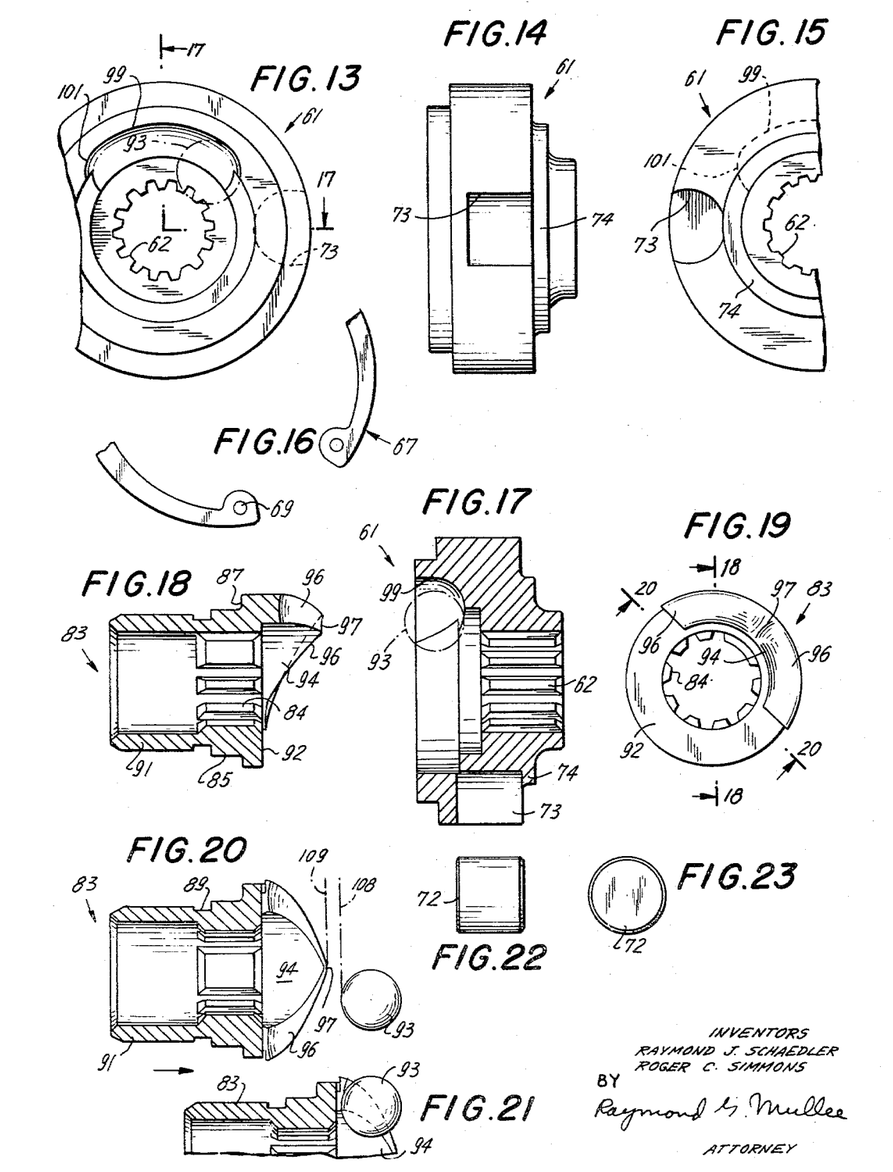
FIG. 13 is an elevational view of the front face of the hammer flange.
FIG. 14 is a side elevation of the hammer flange.
FIG. 15 is a fragmentary elevational view of the rear face of the hammer flange.
FIG. 16 is a fragmentary view of the snap ring for the hammer flange.
FIG. 17 is a longitudinal section of the hammer flange along the irregular line 17—17 of FIG. 13, showing in broken lines the driving cam ball.
FIG. 18 is a longitudinal section of the driven cam along the line 18—18 of FIG. 19, being in the same plane of section as FIGS. 1, 4 and 6.
FIG. 19 is an elevational view of the rear face of the driven cam.
FIG. 20 is a longitudinal section of the driven cam along the line 20—20 of FIG. 19, showing also the driving cam ball, the relative position of the parts being at the instant of impact which corresponds also to FIGS. 6 and 7.
FIG. 21 is a view similar to FIG. 20 but with the driven cam and driving cam ball in the relative position at the start of cam engagement, and the driven cam in FIGS. 1, 4, 5, 13 and 17.
FIG. 23 is a rear end view of the driving roller.

For reciprocating the yoke 81 and therefore the dogs 71, a cam sleeve 83 is provided. As shown in FIGS. 18, 20 and 21, the cam sleeve has an internally splined portion 84 shaped to interfit with the splined portion 55 on the anvil 33 (FIGS. 2 and 3). The teeth of both sets of splines extend longitudinally with no helical component, thereby permitting the cam sleeve to slide back and forth axially relative to the anvil 33 but preventing any relative rotary movement therebetween. As a result, the cam sleeve is always in the same angular position relative to the anvil jaws 54. The internal splines 84 are produced by a broaching operation. In order to preclude the possibility of inadvertently disturbing the predetermined angular relation aforesaid, upon disassembly and re-assembly, one groove in the splined portion 84 is omitted thus forming a wide tooth. Cooperating with the wide tooth to permit assembly in one position only is a wide groove in the splined portion 55 of the anvil formed by omitting or removing one of the teeth on the anvil 33. Surrounding the internal splines 84, the cam sleeve 83 has a trunnion portion 85 which fits within a bore 86 in the yoke 81 for relative rotary movement. Relative axial movement is prevented by a shoulder 87 on the cam sleeve which abuts against the rear face of the yoke 81, and by a snap ring 88 which abuts against the front face of the yoke. The snap ring is seated in an annular recess 89 in the cam sleeve 83 and retained therein against axial movement relative to the sleeve. It is a one-piece split ring and is adapted to be disassembled by prying apart the free ends of the ring to expand its diameter. The snap ring also serves as an abutment for the rear end of a helical compression spring 90, the front end of which is seated against the anvil jaws 54. Forward of the annular recess 89, the cam sleeve 83 has a sleeve portion 91, the outside surface of which guides and centralizes the spring 90 and the inside surface of which has slidable engagement with a cylindrical surface on the anvil to support the cam sleeve against axial disalignment relative to the anvil. The helical spring 90 cooperates with the ring 88, sleeve 83 and yoke 81 to form a de-clutching means, and urges the dog pins 71 at all times toward the position illustrated in FIGS. 1 and 4 where the striking elements 77 of the dogs lie rearwardly of and outside the path of the anvil jaws 54. In that position, the spring is under pre-compression but rearward movement of the cam sleeve 83, and further extension of the spring 90, are limited by the front end of the cam pilot 58 which abuts against a flat face 92 at the rear end of the cam sleeve 83 immediately surrounding the splined portion 84.

The means for intermittently moving the reciprocating elements forward in opposition to the force of spring 90 will now be described. It includes a steel ball 93 which forms the driving element of a cam mechanism. The driven element of the cam mechanism comprises a lobe 94 formed integrally on the cam sleeve 83 and projecting rearwardly from the flat face 92 thereof. The cam ball 93 rolls or travels in a fixed orbital path around an annular raceway 95 in the cam pilot 58. The axis of the ball, therefore, always remains in the same transverse plane. The raceway 95, in longitudinal section, has an arcuate shape to fit the radius of curvature of the ball, but extends further outward at the rear side than at the front side of the raceway as shown in FIGS. 4 and 5. The rear side of raceway 95 sustains longitudinal thrusts at times which tend to move the ball rearward. Referring to FIG. 4, the narrowest part of raceway 95 is axially spaced from the front extremity of the cam pilot 58 by a distance which is slightly greater than the radius of ball 93 with the result that the ball is held out of engagement with the flat face 92 on the cam sleeve 83.

This separation is desirable, although not necessary, because it avoids friction which might otherwise be created if the ball were permitted to roll or drag over the face 92. The cam lobe 94 has a pair of raceways 96, each of slightly larger radius in cross section than the ball, the two raceways being oppositely inclined in a helical direction to meet at a crest 97, as best shown in FIG. 20. As shown in FIGS. 5, 7 and 19, each raceway 96 is of such circumferential extent that the ball 93 engages the raceway during approximately 90° of revolution of the ball relative to the cam 83 in travelling from the base end of the lobe 94 to the crest 97. The ball engages the raceway with a combined rolling and sliding action.

The ball 93 is driven by the driving plate 61, being received in an arcuate groove 99 (FIGS. 5, 6, 13, 15 and 17) at the front of the plate. The annular groove has a shoulder 101 at each end for driving the ball in one direction or the other, each shoulder in longitudinal section having the same radius of curvature as the ball, as shown in FIGS. 5, 7, 13 and 15. The arcuate groove 99 is of such circumferential extent that the ball may revolve independently of the driving plate for approximately 80° in travelling from one shoulder to the other, that is, approximately 40° in either direction away from a median position. Each shoulder 101 has the shape of a segment of a sphere and fits the ball over a substantial area. The rest of the arcuate groove 99 in cross section has a shape which is partly toroidal and partly cylindrical, the rear end having the same radius of curvature as the ball in longitudinal secution, as shown in FIGS. 4 and 17. Preferably, the arcuate groove 99 has a sufficient axial depth so that the driving plate 61 is relieved of the axial thrust on the ball, such thrust being sustained by the cam pilot 58 as previously described. The outermost (cylindrical) part of the groove 99 has a radius which exceeds the radius of the cam pilot 58 at the narrowest cross section by a distance which is slightly greater than the diameter of the ball cam 93, thus permitting the ball to revolve between the shoulders 101, while preventing the ball from moving radially out of its orbital path as long as the cam pilot, ball and driving plate 61 are assembled.

The impact clutch assembly 32, which includes the hammer 63 and the elements surrounded thereby is arranged to be lubricated and cooled by keeping it partly submerged in a suitable oil such as SAE–30. The oil is admitted through the usual oil-hole (not shown) and passage 102 to the interior of housing 30 until it half fills the clutch chamber which lies between the motor end plate 36 and the bushing 46. It has been found that there is a tendency for live air to leak from the motor into the clutch chamber and build up pressure gradually while the motor is running, and later return through the same passages, carrying the oil with it. The path of the leaking pressure fluid is from the live air passages in the motor 31, radially inward between the rotor 35 and end plate 36, and axially forward in the annular clearance space between the outer surface of the front rotor shaft 41 and the bores of end plate 36 and ball bearing 42 respectively. When the motor is stopped by cutting off the supply of live air, the pressure in the motor passages drops below the accumulated pressure in the clutch chamber and the direction of flow is reversed, but the pressurized air forces the oil out of the clutch chamber and into the motor passages with the result that the impact clutch might wear excessively because of insufficient lubrication. To minimize the build up of pressure, the end plate 36 is provided with a bleed passage 103 extending radially to an exhaust passageway 104 in the housing 30. As a further means of preventing escape of oil from the clutch chamber, the motor end plate 36 is recessed to receive an oil seal 105 immediately in back of the ball bearing 42. The oil seal is of a well known type and has a flexible portion of conical shape tapering forwardly and embracing the motor shaft 41. Due to the inclination of the flexible portion, the seal tends to grip the motor shaft more firmly when the pressure in back of the seal drops below the pressure in front of the seal, thus acting as a check valve. A similar oil seal 106 is affixed to the front end of the nose piece 44 of the housing and embraces the cylinder portion 48 of the anvil 33 with a rotating fit to prevent escape of oil through the front end of the housing. Leakage of oil around the outside of motor end plate 36 is prevented by an O-ring 107.

Figure 24:
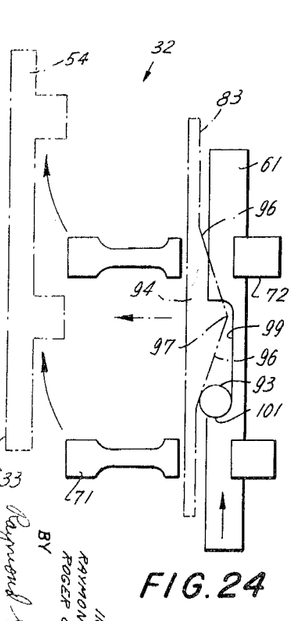
FIG. 24 is a development showing the driving rollers, hammer flange, driving cam ball, driven cam, dogs and anvil at the start of camming engagement, with the elements in the position shown in FIGS. 1, 4, 5, 8, 13, 14, 15, 17 and 21.
Figure 25:
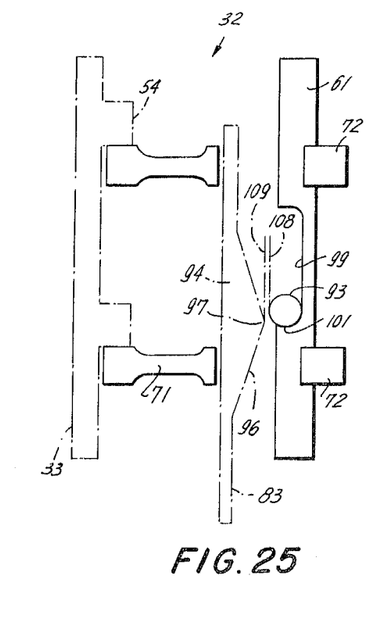
FIG. 25 is a development similar to FIG. 22 with the anvil in the same position as in FIG. 24 but with the dogs rotated and moved forward to the striking position at the instant of impact, as in FIGS. 6, 7, 9, 10, 11, 12 and 20.
Figure 26:
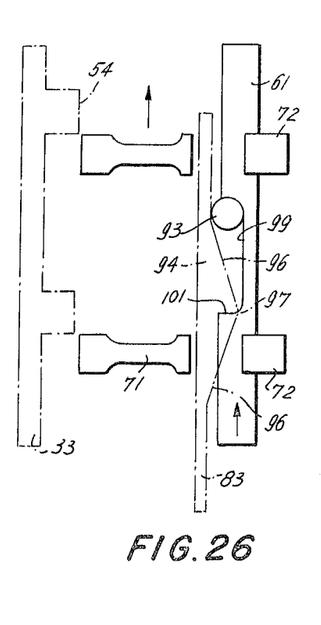
FIG. 26 is a development similar to FIGS. 24 and 25 with the dogs returned axially rearward to declutched position and the driving cam roller rotated forward to permit rearward movement of the driven cam.

FIGS. 24, 25 and 26 are development views showing in simplified form the position of certain elements relative to the anvil at three different stages in the cycle of operation. Movement in a clockwise direction is represented by a displacement in an upward direction and the parts which rotate relative to the anvil are depicted in full lines. The anvil 33, which is assumed to be non-rotating, is illustrated in dot-dash lines and at the same level in all three views; and the same is true of the cam sleeve 83 which does not rotate relative to the anvil. Axial forward movement of both the rotating and non-rotating parts is indicated by a shift to the left in the development views. The arrows indicate the direction of motion of an associated element which either continues or begins at that particular instant or stage in the cycle of operation. The straight vertical arrow in FIG. 24 indicates that the driving plate 61 is rotating clockwise at the time that the ball 93 first engages the cam lobe 94, and the same would be true of the hammer (not shown) which is rigidly connected with the plate 61. The horizontal dot-dash arrow in FIG. 24 indicates that the cam sleeve 83 is just starting to move forward. The curved arrows in FIG. 24 indicate that the dogs 71 have just changed their motion to a helical direction. The upwardly directed arrows in FIG. 26 indicate that the driving plate 61 and dogs 71 are just starting to revolve clockwise.

The operation of the invention will now be described. As stated previously, it will be assumed that the anvil 33 is immovable and remains in the same position relative to the housing 30 at all times, as shown in FIGS. 1, 4–11 incl., 24, 25 and 26, with the result that the cam sleeve 83 always remains in the angular position shown in those views and also in FIGS. 18, 19 and 21. It will be understood that the cam action of the impact clutch assembly 32 is the result of the rotation of the hammer assembly relative to the anvil, and wherever mention is made of rotation for any given number of degree, what is meant is rotation relative to the anvil 33 and not necessarily relative to the housing 30, unless otherwise specifically stated.

The term "hammer assembly" as used in the following description includes the hammer 63, driving roller 72 and driving plate 61 which are axially immovable; also the dogs 71 and yoke 81 which reciprocate relative to the hammer 63 and anvil 33. In the illustrative embodiment all parts of the hammer assembly rotate in unison with each other and with the motor shaft 41, but it would be possible to modify the construction to permit limited rotation of one element of the hammer assembly relative to another while still retaining some of the advantages of the present invention. The dogs 71 and yoke 81, while revolving, partake of the reciprocating movement of the cam sleeve 83 which does not rotate. Most of the mass, and most of the moment of inertia, of the hammer assembly resides in the elements which do not reciprocate and therefore the impact clutch of the present invention minimizes virbations and shocks.

The term "cam mechanism" refers to the combination of elements which convert the rotational movement of the hammer assembly into reciprocating movement of the yoke 81. It comprises the driving cam element or ball 93, and the driven cam element which consists of the lobe 94 on the rear part of the cam sleeve 83. When the cam elements are out of engagement, the ball may float angularly relative to the driving plate 61 or relative to the cam driven element, or relative to both. The elements of the cam mechanism are engaged only when the ball 93 is in contact with the driving shoulder 101 and the driven cam lobe 94 at the same time. Cam engagement begins when the clutch parts arrive at the position shown in FIGS. 5 and 24. It continues for almost 90 degrees of rotation of the driving cam element and then the cam elements disengage at the instant that the ball 93 passes the crest 97 of the cam lobe 94.

When the motor 31 is at rest, the spring 90 is extended to its maximum length but is still under precompression and the cam sleeve 83 is in its most rearward position, with the flat face 92 thereof seated against the front end of the cam pilot 58. The cam ball 93 lies adjacent to, but out of contact with, the flat face 92 and the ball lies somewhere between the base end of the cam lobe 94 on one side and the base end on the other side. In relation to the driving plate 61, the ball 93 lies in the arcuate groove 99 somewhere between the driving shoulders 101 which define the ends of said groove.

With the parts of the impact clutch assembly 32 in the respective positions just described, the operator admits live air through the usual throttle and reverse valves (not shown) to drive the motor 31 in a clockwise direction, looking forward. When the motor is started, the hammer assembly is carried along with the rotor 35 to rotate in unison therewith by means of a rigid driving connection through the shaft 41, driving plate 61, driving roller 72 and hammer 63. The rigid driving connection is shown best in FIG. 11. At first, the rotation of the drive shaft 41 is unopposed, except for friction and the inertia of the hammer assembly which it drives, as the motor quickly accelerates. In the illustrative embodiment of this invention, the first period of free acceleration continues for a maximum turn of 258°, including 78° or less or lost motion of the driving plate 61 relative to the ball 93, and 180° or less of rotation of the driving plate with its shoullder 101 in driving contact with the ball.

At the end of the free acceleration period, the cam mechanism engages, as shown in FIGS. 4, 5, 21 and 24, and driving shoulder 101 delivers an impulse through the ball to the base end of the cam lobe 94. Due to the helical inclination of the cam raceway 96, the force of the impulse is resolved into two components, one in an axial direction tending to move the cam sleeve 83 forward relative to the anvil 33, and the other in a rotary direction tending to turn the sleeve, together with the anvil, clockwise relative to the housing 30. The axial component is resisted by the force of the precompressed spring 90 and by the inertia of the reciprocating elements such as the cam sleeve 83, yoke 81 and dogs 71. The rotary component is resisted by the external load (not shown) and by the moment of inertia of the anvil 33 and elements rotatably carried thereby relative to the housing. The force of the impulse delivered through the ball to the base of the cam lobe 94 is greater if the hammer assembly happens to travel through 258° rather than through a smaller arc because of the greater speed of the motor 31 and the greater moment of angular momentum of the hammer assembly and rotor 35 just prior to the impulse.

It is possible under some operating conditions, particularly if the external load on the anvil 33 is light and the live air is admitted to the motor 31 gradually, that the first impulse will be insufficient to overcome the preload on the compression spring 90, in which event the ball 93 will remain at the base of the cam lobe 94 and cause the hammer assembly to drive the cam sleeve 83 and anvil 33 with uniform clockwise rotation relative to the housing 30. Under slightly modified conditions, it is possible for the ball 93 to climb part way up the side of the cam lobe 94 while pushing the cam sleeve 83 forward to increase the compression on spring 90 and attain a position of equilibrium along the intermediate portion of helical raceway 96 with the axial component of the force delivered through the ball and raceway being balanced by the force of the spring 90, after which the hammer assembly and anvil 33 rotate clockwise in unison relative to the housing. Under usual conditions, however, the relative rotation between the driving shoulder 101 and the cam sleeve 83 does not stop when the ball 93 reaches the base of the cam lobe 94 or even when it reaches an intermediate position on the helical raceway 96 but continues to permit the ball to travel over the full length of the raceway 96 until the ball 93 reaches the crest of the lobe 94.

The cam engagement between the ball 93 and helical raceway 96 occurs with a combined rolling and sliding action, with the latter predominating. The same is true of the engagement between the ball and the rear side of the raceway 95 in the cam pilot which sustains the rearward thrust transmitted through the ball. During the period of cam engagement, the rotor 35 turns about 90° while continuing to accelerate and to carry the hammer assembly with it. The dogs 71 are carried clockwise and also have an axial component of motion at the same time, due to the action of the cam mechanism which is transmitted through the non-rotating cam sleeve 83 and the rotating yoke 81. At the instant of disengagement of the cam mechanism, that is when the ball passes the crest 97, the dogs 71 are travelling at a high speed in a helical direction with the striking portions 77 projecting for most of their length into the path of the anvil jaws and closely approaching the striking position. By "path of the anvil jaws" is meant the annular space through which the concave stricken surfaces 79 on the anvil jaws travel as the anvil 33 rotates relative to the housing 30. At the instant of disengagement of the cam mechanism, the cam sleeve 83 is approaching its most forward position, and the crest 97 lies in a plane adjacent to the front end of the ball 93, which plane is represented by the broken line 108 in FIGS. 20 and 25.

The period which follows the instant of cam disengagement may be referred to as the overthrow period. During the latter period, the hammer assembly, along with the ball and the rotor 35, continue to revolve clockwise under their own angular momentum and continue to accelerate as a result of the action of live air against the vanes 39 in the rotor 35. At the same time the reciprocating elements continue their forward movement under the momentum of the cam sleeve 83 and the axial component of the momentum of the yoke 81 and dogs 71. Unlike the rotational movement (and rotational component of the helical movement) the axial movement (and axial component of the helical movement) decreases in speed during the overthrow period because of the increasing resistance of spring 90 and the absence of any thrust from the cam mechanism. After the overthrow period has progressed for about 12°, the spring acts as a cushion to absorb the axial momentum of the reciprocating parts, and first retards and later terminates the forward axial movement of the dogs 71. At the instant that the spring 90 attains its maximum compression and the overthrow movement terminates, the cam crest 97 lies in the transverse plane 109 in FIGS. 20 and 25, and the striking portions 77 of the dogs are in complete overlap with the orbital path of the anvil jaws 54. The spring 90 then tends to recoil to move the cam sleeve 83 and dogs axially in a declutching direction but the declutching movement is delayed as will be explained presently.

Just about the time that the declutching movement of the pair of dogs 71 is about to start, the rotational movement of the hammer assembly relative to the anvil is arrested abruptly by the impact of the striking dog portions 77 against the anvil jaws 54. During the delivery of the rotational hammer blow the hammer assembly and anvil rotate together in a clockwise direction relative to the housing. At this time the torque delivered to the anvil is relatively high and the resulting friction between the dogs and anvil jaws prevents the dogs from moving in a declutching direction. At the end of the rotational impact, the torque delivered to the anvil through the dogs is limited to the static capability of the vane motor 31 and the resulting friction is overcome by spring 90 which moves the dogs to declutched position.

Under extremely light load conditions the impact blow drives the anvil rotationally ahead of the hammer assembly momentarily. Under heavy load conditions the anvil recoils rotationally causing the hammer assembly to rebound counter-clockwise momentarily. In either of these two instances, the impacting surfaces 77 and 79 on the dogs and anvil respectively are temporarily relieved of all friction load. However, the spring 90 must be strong enough to accommodate the more prevalent load conditions under which the friction load on the dogs, at the termination of an impact, is immediately followed by the static load due to motor torque, with no appreciable relaxation of load in the meantime.

By assuring full engagement of the striking dog portions with the anvil jaws 54 over their entire axial lengths, and at a time when there is no relative axial movement, the present invention minimizes the wear on the dogs and anvil as compared with prior arrangements in which the dogs are only partly engaged or overlapped with the anvil jaws and declutch during impact, with resulting excessive scuffing between impacting surfaces, and premature destruction. Other characteristics which minimize wear and shocks will be discussed later.

The reason that the dogs are always in fully engaged position and axially immovable just prior to impact is because the invention insures a proper correlation between the axial and the rotative movements of the dogs, irrespective of the position of the anvil relative to the housing, or the resistance of the threaded fastener being driven by the impact wrench, or the speed of the motor. The driving shoulder 101 is carried by the hammer assembly in its rotation and therefore always remains in the same predetermined angular relation to the dogs 71. The cam sleeve 83 is carried by the anvil 33 in the rotation of the latter relative to the housing 30, and therefore always remains in the same predetermined angular relation to the anvil jaws 54. Accordingly, the elements of cam mechanism start to engage (FIGS. 4, 5 and 24) when the dog striking portions 77 arrive at a rotary position that is a predetermined number of degrees (say 102°) in advance of striking position, and disengage when the dogs arrive at a second angular position (FIGS. 6, 7 and 25) that is a predetermined number of degrees (say 12°) close to the striking position. The axial movement of the dogs between initial cam engagement and cam disengagement is fixed by the dimensions of the cam lobe 94 and does not vary with the speed, or torque reaction or other operating conditions. The final axial movement, which occurs during the overthrow period between cam disengagement and impact, may be determined either empirically or by calculation, being controlled by substituting a stronger or a weaker spring, to shorten or lengthen respectively the axial movement of the reciprocating parts. It does not vary appreciably under different operating conditions. The axial overthrow, represented by the distance between lines 108 and 109 in FIGS. 20 and 25, is less than 20 percent of the total axial movement so that any variation in the overthrow will not materially affect the axial depth of engagement of the dog striking surfaces 77 with relation to the anvil jaws 54.

Both dogs 71 strike the respective anvil jaws 54 at precisely the same instant and with full engagement with the impact receiving surfaces 79 to balance the radial shocks on anvil 33 and avoid any tendency of the anvil to misaline its axis with that of the casing 30 or hammer 63. The direction of the hammer blow of dog 71 against anvil jaw 54 is represented by the arrow 111 in FIG. 10. At the time of impact, neither the anvil nor the hammer assembly is subjected to any shocks in an axial direction because the jaws are not moving axially at that time, and because the blow is transmitted over a wide area of the cylindrical surfaces 79 which extend longitudinally with no tendency to react with an axial component.

The cam sleeve 83 and the ball 93 are relieved of axial shocks at the time of impact, and during any rebound action of the hammer assembly that may occur subsequent to impact, because of the overthrow action which places the cam raceway 96, including the crest 97 safely beyond the range of the orbital path of the ball, as illustrated in FIGS. 20 and 25. The shocks which are delivered to the hammer assembly at the time of impact are due mainly to the reactive forces transmitted in a counter-clockwise direction from the anvil jaw 54 thorugh the dog striking portions 77 (FIG. 12), and hammer recesses 70 to the front end of the hammer 63 to absorb the angular momentum of the hammer assembly and rotor 35. A part of this rotational shock is transmitted further back through the rear end of the hammer 33, arcuate recesses 70 (FIG. 11), driving roller 72, hammer flange 61 and drive shaft 41 to absorb the angular momentum of the hammer flange 61, shaft 41 and rotor 35. At the forward end of the hammer, the major shocks are sustained by the dog striking portions 77 for the full axial length thereof, being transmitted in a direction radially of the individual axis of the dog 71 with the center of the impacting forces extending in the direction of the arrow 111 (FIG. 10) which passes approximately through the axis of the dog 71. The result is that the striking portions 77 of the dogs, at the time of impact, are under compression between the driving force of hammer recess 70 and the diametrically opposed reactive forces of the stricken surface 79 on the anvil jaw, both forces acting in the same cross-sectional plane. In prior constructions, however, the driving and reactive forces were not in same straight line but formed a force couple in shearing relation, with the hammer forces driving the rear part of the pin and the reaction of the anvil being transmitted to the front part of the pin in advance of the forward extremity of the hammer. It has been found that the shearing forces in the prior art have a tendency to deflect the dogs into misalignment, thereby creating premature wear and fatigue failure not only of the dog but also of the associated parts of the anvil and hammer which transmit the impacts through the dogs and receive the reaction therefrom. The delivery of compressive instead of shearing force through the dogs is an important object of this invention and is made possible by the fact that the front portion of the hammer 63 completely surrounds the anvil jaws 54 and encloses the dog striking portions 77 at the time of impact, as shown in full lines in FIG. 12, whereas in prior constructions the dog pins had to project beyond the front extremity of the hammer in order to move into the orbital path of the anvil jaws.

The driving roller 72 is arranged to sustain the impact torque load which is due to sudden deceleration of the driving plate 61, shaft 41 and rotor 35 at the time of impact. The roller 72 is compressed diametrically between the driving force of the plate recess 73 in the direction of the arrow 112 (FIG. 12) and the equal and opposite reaction of the hammer recess 70 in the same cross-sectional plane.

As stated previously, the spring 90 starts to expand and move the cam sleeve 83 rearward after the force of the rotational impact has subsided. At that time, the parts are in the position shown in FIGS. 6, 7 and 25 with the possible exception of the ball 93 which may have advanced to the FIG. 26 position as a result of its own momentum. Under some conditions of operation the ball may rebound to the FIG. 25 position where it is still advanced a few degrees beyond the crest 97 but so close to the crest that it obstructs the path of the cam lobe 94 in the declutching movement of the latter. The obstructing action, however, is not effective as a positive lock but merely requires that the cam move the ball out of the way. This unblocking motion is made possible by the fact that the ball 93 is relatively light and is free to float along the arcuate groove 99, with angular lost motion between the ball and hammer assembly. During the rearward movement of the cam sleeve 83, the raceway 96 on the backside of the lobe (the side that is more advanced in a counter-clockwise direction) engages the ball 93 and acts as a wedge to cam the ball 93 in a clockwise direction along the groove 99 until it reaches the position shown in FIG. 26 where it no longer obstructs the declutching movement. In this position, the dogs 71 have been moved out of the orbital path of the anvil jaws 54 to release the hammer assembly for further rotation in a clockwise direction as indicated by the arrows in FIG. 26.

The hammer assembly then starts a new cycle of operation as above described except that the second cycle and each subsequent one includes a full period of about 258° from the time that the rotation of the hammer assembly starts until cam engagement begins, followed by another 102° making a full 360° of rotation from one impact to the next. By delaying the start of the forward movement of the dogs until the hammer assembly has accelerated for about three quarters of a turn, and by moving the dogs quickly into the orbital path of the anvil jaws during the final quarter turn, the cam mechanism makes it possible to obtain a single (and powerful) blow per revolution while distributing the force of the blow evenly over multiple dogs striking multiple jaws simultaneously. Each dog strikes the same jaw 54 every time, and then passes over the non-mating jaw 180° later, as the spring 90 holds the dogs out of the orbital path of the jaws.

When the cam mechanism engages, about 102° prior to impact, it imparts a torsional thrust to the anvil 33, independently of the dogs 71 and tends to turn the anvil forward relative to the housing 30. This torsional thrust may take up an looseness in the driving connection between the square drive 47 and the wrench socket (not shown). At the instant of impact the driving connection is tight and thereby transmits the full force of the rotational impact to the threaded fastener without attenuating it by looseness in the socket connection, as in some prior art devices.

The operation is continued until the driven fastener (not shown) is tightened to its final degree. Near the end of the tightening operation, there is a progressive decrease in the rotational advance of the anvil relative to the housing during each blow, accompanied by a progressive increase in the torsional force of the impact and the amplitude of the counterclockwise rebound of the hammer assembly.

As stated previously, each dog pin 71 may swivel about its own axis relative to the yoke 81 and hammer 63. By swivelling or indexing the dog pin to a new position from time to time, it is possible to distribute the wearing effect of the impact around the entire circumference of the striking portion 77 of the dog, thus prolonging the life of the latter. Indexing motion is produced automatically as follows: During acceleration of the hammer, the dogs resist and tend to rotate counterclockwise relative to the hammer. Such rotation is prevented by friction due to centrifugal force except during engaging motion when such friction is relieved by the sliding action, thereby permitting a slight indexing prior to each blow.

The clutch elements may be assembled and disassembled in a very convenient manner whenever it is desired to replace a worn or broken part. Replacement is also facilitated by the fact that the parts of the clutch, especially the dog pins, are inexpensive to manufacture.

As shown in the drawings, all parts of the illustrative embodiment of invention are symmetrical for either clockwise or counterclockwise rotation. Therefore, if the operator desires to loosen a threaded fastener or drive one with left hand threads, he merely swings the reverse valve lever (not shown) to the opposite direction and operates the impact wrench in a manner like the one previously described. In the operation of the impact wrench in the counterclockwise direction of rotation, the driving cam element or ball 93 is rotatably carried by the hammer assembly in a predetermined fixed angular relation to the dogs 71 during the entire period that the cam mechanism is effective, that is, between the start of cam engagement (comparable to FIG. 24) and the delivery of a rotational impact (comparable to FIG. 25). However, the angular position relative to the dogs is different as compared with the angular position during clockwise rotation because the ball cam 93 is driven by the shoulder 101 at the opposite end of the arcuate groove 99 in drive plate 61. The arcuate distance between the two shoulders 101 corresponds to the angle of lost motion between the driving cam 93 and the hammer assembly. Without such lost motion, any attempt to locate the driving cam at the optimum angle relative to the jaws, to engage the cams at the proper stage of operation in one direction of rotation, would result in the driving cam being out of proper phase relation for the opposite direction of rotation by an angle corresponding to the arcuate distance between the circumferentially spaced shoulders 101. The lost motion between these shoulders makes it possible to engage the cam mechanism at the ideal angular location for both directions of rotation without necessitating any manual adjustment of the cam sleeve 83 or of any other clutch element.

What is claimed is:

1. In an impact wrench, a hammer assembly comprising a hammer element having a central bore of cylindrical shape and rotatable about the axis of the bore, a longitudinal recess in the wall of the hammer element communicating with the bore, a dog received in the recess for slidable movement therealong, the dog being received partly within the recess and partly within the central bore, the front extremity of the hammer element lying forward of the front extremity of the dog at all times, said recess having a uniform cross-section throughout its length, the outer wall of said recess being closed, the mouth of said recess being formed to intersect the central bore along two parallel edges, the distance between said edges being at least equal to the width of the dog, said dog being insertable into and removable from the recess upon motion of translation of the dog in a direction radially of the central recess.

2. In an impact wrench, a hammer assembly comprising a hammer element having a central bore of cylindrical shape and mounted to rotate about the axis of the bore, a longitudinally extending recess in the wall of the hammer element communicating with the bore, said recess being of arcuate cross-section, a dog pin seated in the recess and slidable therealong, the dog pin having a cylindrical portion of substantially the same radius as the recess, said cylindrical portion being received partly within the recess and partly within the central bore, the axis of the recess and of the dog pin being parallel to the axis of rotation of the hammer element.

3. An impact clutch comprising a hammer having a central bore of cylindrical shape and mounted to rotate about the axis of the bore, a plurality of longitudinally extending circumferentially spaced recesses in the wall of the hammer communicating with the bore, a plurality of dogs mounted to reciprocate in the respective recesses, each recess being sufficiently wide to permit displacement of the dog out of the recess and into the central bore, upon motion of translation of the dog radially inward of the central bore, and a yoke reciprocating with the dogs and supporting the dogs against such radial inward movement.

4. An impact clutch comprising a hammer having a central bore of cylindrical shape and mounted to rotate about the axis of the bore, a recess in the wall of the hammer communicating with the bore, the recess having the shape of a half cylinder, a dog mounted to reciprocate in the recess, the dog having one or more portions of cylindrical shape to fit the recess, the axis of the recess and of the dog being parallel to the axis of rotation of the hammer, the diameter of the dog being no greater than the width of the recess at its mouth where it intersects the central bore, and a yoke reciprocable with the dog and supporting the dog against motion of translation in a direction radially inward of the hammer.

5. An impact clutch comprising a one-piece hammer having a bore open at its front end, a counterbore open at its rear end, and a transverse shoulder between the bore and counterbore; a driving plate enclosed within said counterbore and seated against said shoulder, the driving plate having a groove formed therein, the cylindrical wall of the bore and the cylindrical wall of the counterbore being interrupted by a recess of arcuate cross-section extending from end to end of the hammer, the internal surface of said recess forming a half cylinder throughout the length of the bore and less than a half cylinder throughout the length of the counterbore; a cylindrical dog pin mounted to reciprocate in the forward part of the recess; retaining means engageable with the dog pin to prevent it from moving transversely out of the recess, whereby the dog is driven by the hammer in a rotative sense; and a driving roller near the rear end of the hammer, said driving roller having the shape of a cylinder of the same radius as the dog pin and recess, the major portion of the roller fitting within the groove of the driving plate and the minor portion of the roller fitting within the hammer recess.

6. In an impact clutch, a hammer assembly comprising a one-piece hammer having a central cylindrical bore, the cylindrical wall of the bore being interrupted by a recess having an arcuate cross-section, the internal surface of the recess forming a sector of a cylinder, the axis of the recess being parallel to the axis of the central bore, the cylindrical wall of the recess intersecting that of the central bore along two parallel edges defining the mouth of the recess, and a cylindrical dog pin mounted to reciprocate in the recess, the dog pin having a portion of its circumference projecting out of the recess into the central bore when in assembled condition, the diameter of the dog being no greater than the width of the recess at its mouth, whereby the dog may be disassembled by translatory movement of the dog toward the center of the bore.

7. In an impact clutch, a hammer assembly comprising a one-piece hammer having a central cylindrical bore, the cylindrical wall of the bore being interrupted by a pair of recesses, each being of arcuate cross-section, the internal surface of each recess forming a sector of a cylinder the axis of each recess being parallel to the axis of the central bore and being spaced circumferentially by 180° from the axis of the other recess, each recess intersecting the central cylindrical bore along two parallel edges defining the mouth of the recess, and a pair of cylindrical dog pins each mounted to reciprocate in one of the recesses, each dog pin having a sector disposed outside of the recess and in the central bore when the dog and hammer are in assembled condition, the diameter of each dog being no greater than the width of the recess at its mouth, whereby the dog may be disassembled by translatory movement of the dog toward the center of the bore.

8. In an impact clutch, a one-piece hammer having a central bore open at its front end, a central counterbore open at its rear end, and a transverse shoulder between the bore and counterbore, the cylindrical wall of the bore and the cylindrical wall of the counterbore being interrupted by a recess of arcuate cross-section extending from end to end of the hammer, the internal surface of said recess forming a half cylinder throughout the length of the bore and less than a half cylinder throughout the length of the counterbore, the axis of the recess extending parallel to the axis of the central bore and counterbore.

9. An impact clutch comprising a hammer and an anvil rotatable about a common axis, the anvil having an impact receiving jaw, a dog carried by the hammer in its rotation having sliding movement relative to the hammer in a direction parallel to the axis of the rotation, said hammer being rotatable at times ahead of the anvil, means restraining the hammer against axial movement relative to the anvil, a cam mechanism for moving the dog forward into the path of rotation of the anvil jaw when the dog arrives at a predetermined angular position relative to the anvil, said cam mechanism comprising a cam sleeve arranged to reciprocate relative to the anvil in unison with the dog, means restraining the cam sleeve against rotation relative to the anvil, said cam mechanism also comprising a steel ball, the cam sleeve having a helical surface engageable with the ball to impart a forward axial force to the sleeve and dog upon transmission of torque in one direction from the ball to the helical surface, and means for driving the ball, said driving means being rotatable with the hammer, said driving means providing a limited angular lost motion of the ball relative to the hammer.

10. An impact clutch according to claim 9, in which the helical surface on the cam sleeve has a crest and the ball is arranged to override the crest, said crest and ball having such an angular relation to the anvil jaw and ball respectively that the override occurs just prior to impact, said cam sleeve having a second helical surface sloping oppositely to the first on the other side of the crest, said second helical surface being engageable with the ball after the delivery of an impact to move the ball out of the way of the cam sleeve by revolving the ball reversely with respect to the torque transmitting direction, within the limited angle of lost motion.

11. An impact clutch according to claim 9, which includes means for restraining the ball to revolve in a fixed toroidal path with the center of the ball always in the same cross sectional plane.

12. A mechanical movement for converting relative rotary to relative reciprocating motion, comprising a front shaft and a rear shaft in axial alinement, means for driving the rear shaft relative to the front shaft, said shafts being held against relative axial movement, a cam sleeve mounted on the front shaft and slidably splined thereto for longitudinal movement therealong so that the cam sleeve may reciprocate relative to the front shaft but is held against any rotary movement relative thereto, a collar on the front shaft in forward axially spaced relation to the cam sleeve, a compression spring surrounding the front shaft and interposed between the collar and cam sleeve and arranged to urge the latter rearwardly at all times, said cam sleeve having a cam lobe of limited circumferential extent, a helical surface on the cam lobe facing rearwardly, a ball arranged to engage the helical surface with a sliding action, to move the sleeve forward in opposition to the spring, and to override the cam lobe to permit the spring to return the cam sleeve, a driving connection between the rear shaft and the ball, said ball driving means forming part of the driving connection for driving and means for restraining the ball to revolve in a fixed toroidal path transversely of the cam lobe.

13. A mechanical movement according to claim 12, in which the restraining means comprises a cam pilot attached to the front shaft and having an annular raceway which is arcuate in cross section, the rear side of the raceway having a greater radius that the front side of the raceway and being arranged to support the ball against the rearward thrust of the spring trnsmitted through the cam lobe.

14. A mechanical movement according to claim 12, in which the cam lobe is symmetrically arranged with a reversely sloping helical surface beyond the crest of the first helical surface and in which the rear shaft is driven selectively in either direction of rotation.

15. A mechanical movement according to claim 14, in which the driving connection between the rear shaft and ball comprises a driving plate having an arcuate recess in which the ball is received, the ends of the arcuate recess providing shoulders for driving the ball selectively in either direction, said shoulders being spaced to provide lost motion between the driving plate and ball upon reversal of the direction whereby the angular position of the ball relative to the driving plate is different upon engagement of the ball with the lobe in one direction of rotation that in the other direction of rotation.

16. In an impact tool including a housing and a motor supported therein having a forwardly extending drive shaft; an anvil having a forward shank journaled in a front end of the housing and having a pair of opposed impact receiving jaws extending radially from the rear of the shank; a bushing seated on the shank forwardly of the jaws having a peripheral surface extending radially beyond the jaws; an elongated cylindrical hollow hammer open in a front end thereof having an axis of rotation common with that of the anvil and drive shaft; a driving plate at the rear of the hammer drivingly engaging the hammer with the drive shaft; the forward end of the hammer having an internal bearing support upon the periphery of the bushing; the anvil having a rear shaft extending axially beyond its jaws; a cam sleeve having a splined connection with the rear shaft for axial slidable movement therealong; the rear shaft terminating in a reduced end piece; a cam pilot rotatably seated on the end piece abutting at one end the splined connection and abutting at its other end the driving plate; the hammer having a pair of diametrically opposed grooves extending for the length of its internal wall in parallel relation to the axis of rotation of the rear shaft; an elongated cylindrical pin seated in each groove and slidable therealong; each pin having a neck portion at its rear and an impacting portion at its front; the impacting portion having slightly more than half of its peripheral surface projecting radially from the related groove into the interior of the hammer; the pins having a normal position wherein the impacting portions are disposed rearwardly and clear of the anvil jaws, and an advanced position wherein the radially projecting peripheral surfaces of the impacting portions intercept the path of rotation of the anvil jaws; yoke means engaging the neck portions of the pins swiveled on the cam sleeve and movable as a unit with the cam sleeve for carrying the pins to and from their advanced positions; the cam pilot having a ball raceway about its periphery; a cam lobe on the cam sleeve normally intercepting the raceway; a cam ball movable around the raceway having cooperation with the cam lobe so as to force the cam sleeve forwardly along the rear shaft to carry the pins to their advanced positions; driving means on the driving plate for driving the cam ball around the raceway and over the cam lobe; and return spring means on the rear shaft yieldably biasing the cam sleeve to a position holding the pins to their normal positions.

17. In an impact tool as in claim 16, wherein each anvil jaw has an impact receiving face having a radius of curvature corresponding to that of the radially projecting peripheral surface of one of the pins, whereby the said pin is during impact under compression between the wall of the groove of the said pin and the impact receiving face of the anvil jaw.

18. In an impact clutch tool as in claim 16, wherein the driving means on the driving plate comprises an arcuate raceway into which the cam ball projects in part, the raceway having an arcuate shoulder at one end engageable with the ball for driving it in one direction in a selected direction of rotation of the drive shaft, and having an arcuate shoulder at its opposite end engageable with the ball for driving it in the opposite direction in a selected reverse direction of rotation of the drive shaft.

19. An impact clutch comprising a hollow hammer and an anvil rotatable about a common axis, an impact receiving surface on the anvil rotatable in a fixed annular path, an elongated cylindrical impacting pin carried by the hammer in its rotation, the hammer having in its internal wall a longitudinally extending groove in which the pin is seated for slidable movement therealong relative to the hammer, the pin having a forward portion of which slightly more than one half of its peripheral surface projects radially into the interior of the hammer from the groove in all positions of the pin and the remaining part of the peripheral surface being seated in all such positions within the groove, means for slidably reciprocating the pin along its groove so as to advance the projecting peripheral surface of the pin transversely of the annular path of the impact receiving surface of the anvil, the impact receiving surface of the anvil having a radius of curvature corresponding to that of the forward portion of the pin, and the extent of said curvature mating substantially with one half of that of the said radially projecting peripheral surface of the pin upon impact of one with the other, whereby said forward portion of the pin is caused on impact to be in compressive relation diametrically between the internal wall of its groove and the impact receiving surface of the anvil.

20. An impact clutch comprising a hammer and an anvil rotatable about a common axis, the anvil having an impact receiving jaw, the hammer having a longitudinally extending groove formed therein, a dog carried by the hammer in its rotation in the longitudinally extending groove formed in the hammer and having slidable movement along the groove in a direction parallel to said axis of rotation, said hammer being rotatable at times ahead of the anvil, means holding the hammer against axial movement relative to the anvil, a cam mechanism for moving the dog forwardly into the annular path of the anvil jaw when the dog arrives at a predetermined angular position relative to the anvil, said cam mechanism comprising a cam sleeve arranged to reciprocate relative to the anvil in unison with the dog, means restraining rotation of the cam mechanism relative to the anvil, said cam mechanism including a single steel ball, the cam sleeve having a pair of selectable helical surfaces each engageable at a separate time with the ball to impart a forward axial force to the sleeve and dog upon transmission of torque from the ball to the helical surface selected, and ball driving means carried by the hammer in its rotation for selectively driving the ball in one direction for engagement with one of said helical surfaces and for driving it in an opposite direction for engagement with the other of said helical surfaces.

21. An impact clutch as in claim 20, wherein said ball driving means comprises an arcuate ball raceway in the hammer in which the ball is rollable having a pair of arcuate end shoulders in opposed relation to each other.

22. An impact clutch according to claim 21, including a motor drive, and a driving plate carried by the hammer engaging the hammer with the motor drive, wherein the arcuate raceway is formed in the driving plate.

References Cited by the Examiner
UNITED STATES PATENTS

| | | | |
|---|---|---|---|
| 1,913,046 | 6/33 | Callan | 192—30.5 |
| 2,373,666 | 4/45 | Emery | 192—30.5 |
| 2,564,224 | 8/51 | Mitchell et al. | 192—30.5 |
| 2,684,738 | 7/54 | Kaplan | 192—30.5 |
| 2,784,818 | 3/57 | Maurer | 192—30.5 |
| 2,836,272 | 5/58 | Kaman | 192—30.5 |
| 2,850,128 | 9/58 | Van Sittert | 192—30.5 |
| 2,881,884 | 4/59 | Amtsberg | 192—30.5 |
| 3,106,274 | 10/63 | Madsen | 192—30.5 |
| 3,129,796 | 4/64 | Karden | 192—30.5 |

DAVID J. WILLIAMOWSKY, *Primary Examiner.*